Figure 1:
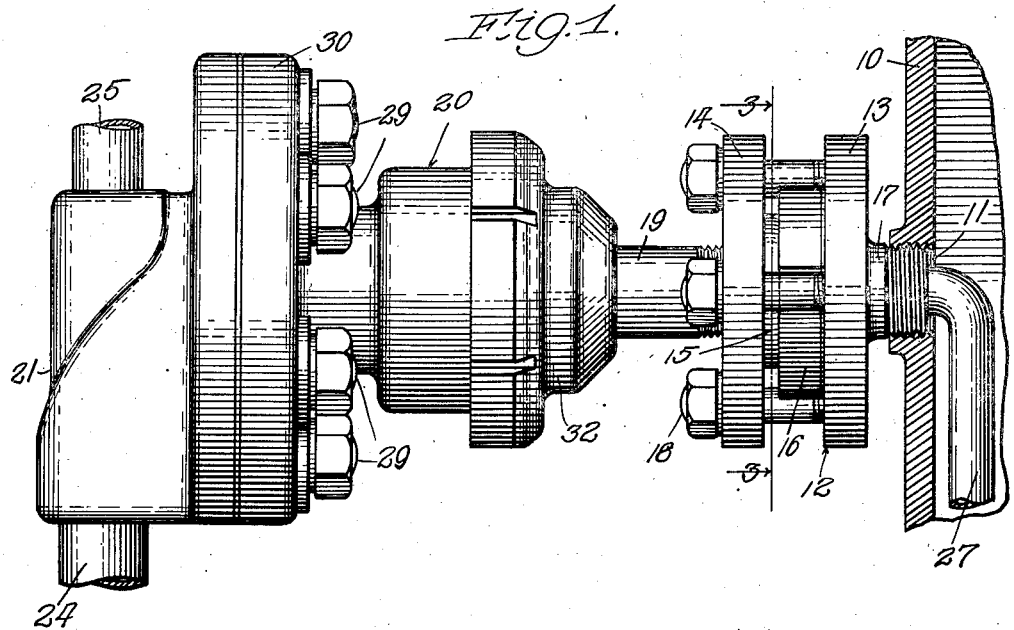

March 28, 1950 F. N. BARD 2,502,365
REVOLVING JOINT
Filed March 6, 1946 2 Sheets-Sheet 1

Inventor:
Francis N. Bard,
By Chritton, Schroeder, Merriam & Hofgren,
Attys.

March 28, 1950     F. N. BARD     2,502,365
REVOLVING JOINT
Filed March 6, 1946     2 Sheets-Sheet 2
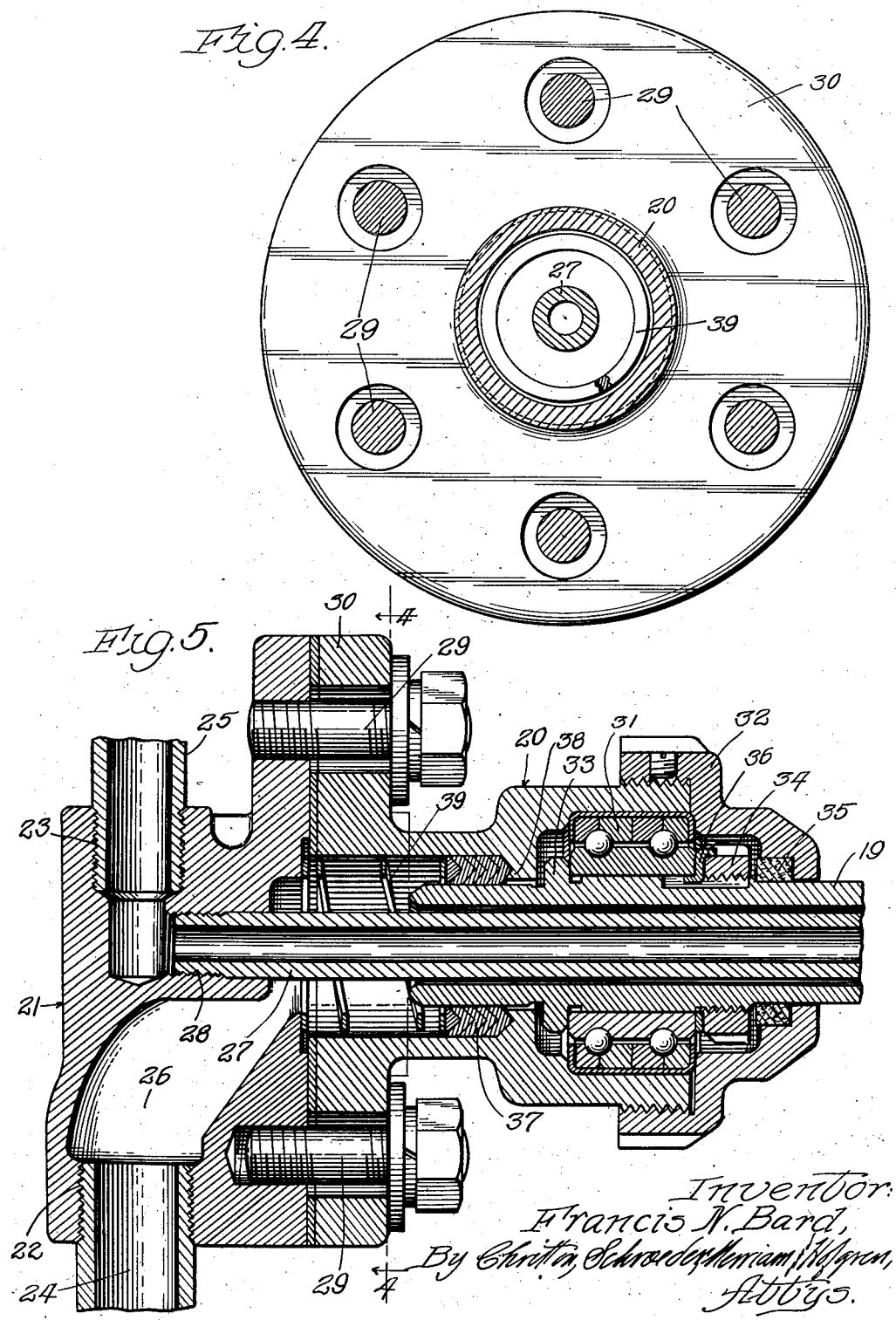

Patented Mar. 28, 1950

2,502,365

UNITED STATES PATENT OFFICE 2,502,365

REVOLVING JOINT

Francis N. Bard, Highland Park, Ill.

Application March 6, 1946, Serial No. 652,254

4 Claims. (Cl. 285—10)

The present invention relates to conduit joints and more particularly to revolving joints incorporating adjustable means for misalignment of the parts connected by the joint.

Revolving joints of the type with which this application is concerned usually comprise two members telescopically joined together to form an inner movable member and an outer stationary member. Those members must be in substantially perfect alignment with the conduit sections connected by them in order to prevent excessive wear. In fact, unless the parts are substantially aligned, it is impossible to connect the parts. They, furthermore, must usually be assembled at points other than their place of manufacture, as they are normally employed as parts of a conduit system installed in a building or vehicle, and under such circumstances perfect alignment is difficult to obtain and much time is wasted in connecting the parts. An object of the invention is to provide a revolving joint with an adjustable connection with one of the conduit sections so as to eliminate the effect of such misalignment and facilitate connecting the parts.

Another difficult alignment problem arises in connection with joints for conduits leading to or from a revolving receptacle such as a drum. In such cases, the conduit must be connected to a fitting located exactly in the axis of rotation of the receptacle and parallel therewith or excessive wear occurs between the parts of the joint. Another object of the invention, therefore, is to provide a joint means for compensating for misalignment due to off-center location or improper installation of such fittings.

Figures 2, 3:
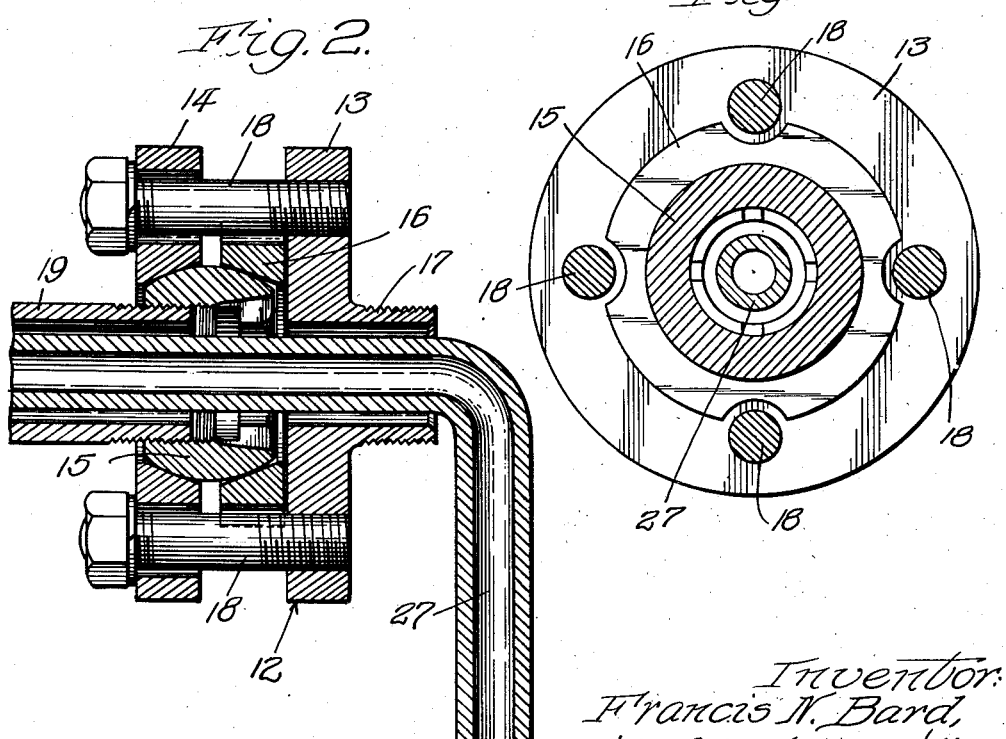

Further objects, advantages and features of the invention will be apparent from the following specification and the drawing, in which:

Figure 1 is a side elevational view of a joint embodying the present inventions, the end of a revolving receptacle with which such joint is associated being partially shown in section; Figure 2 is a longitudinal sectional view of the portion of the joint adjacent the receptacle; Figure 3 is a cross-sectional view, taken on the line 3—3 of Figure 2; Figure 4 is a cross-sectional view taken on the line 4—4 of Figure 5; and Figure 5 is a longitudinal sectional view of the remainder of the joint not shown in Figure 2.

Referring to the embodiment of the invention shown in the drawing, 10 represents the end wall of a revolving receptacle such as a laundry drum. The drum is provided with an axial support and means for rotating it on said support. This support and rotating means may be of conventional type and are not shown in the drawings.

In the center of the end wall the drum is provided with an opening 11 into which is threaded a joint member 12, comprising casing or end members 13 and 14, ball member 15, and an annular member or gasket 16. As shown, the casing member 13, which is adapted to be attached to the drum, has a central hollow boss or projection 17 which is threaded into a central opening 11 in the end wall of the drum 10; and the two casing members are fastened together by a plurality of threaded bolts 18. The ball member, which has an outer surface comprising substantially the central segment of a sphere, is threaded onto the end of a conduit section 19, and the bores of the casing member 14 and gasket 16 slope upwardly more or less complementary to the curve of the ball member, so that this member has a line contact with each as the bolts 18 are tightened. It will be noted that the openings in the member 14 through which the bolts 18 extend are of greater diameter than the bolts, so as to permit ready attachment of the members 13 and 14 even through the bore of the conduit section 19 is out of alignment with the opening in the drum 10. The ball member 15 is angularly adjustable and will compensate for any slight off center position or angular misalignment of the opening 11 in the drum. Should this opening not be in the exact center of the wall 12, the ball member will move to a position where the bore of the pipe 19 and the axis of the drum 10 are aligned when the bolts 18 are tightened. Because of the universal angular movement of the ball, angular misalignments of the bore and drum axis are compensated for; and because of the large holes in the member 14 the bolts may be drawn up with the bore of the pipe 19 in perfect alignment with the drum axis to compensate for transverse variation or misalignments. In such case, the member 16 will be moved by the ball member as the parts are assembled and the casing members are laterally displaced so as to leave the pipe 19 in proper position, i. e. in perfect alignment with the axis of the receptacle, even though the hole 11 and fitting may be slightly out of angular alignment, or not coincide, with such axis.

Referring to Figure 5, the conduit section 19 extends into a joint part or member 20 which is bolted to a fitting, or terminal conduit part, 21, having outlets 22 and 23 into which are threaded an inlet pipe, as a steam pipe 24, and an outlet or siphon pipe 25, respectively. The opening 22 communicates with a passageway 26 leading to the bore of the member 20, then to the bore of the pipe or conduit section 19 and to the interior of the drum through the joint 12. The opening 23 communicates with a pipe 27, threaded into an opening 28 in the fitting 21, and which passes through the pipe section 19 and extends into the drum 10 where it is bent and terminates at a point adjacent the drum bottom.

The fitting or terminal part 21 is also provided with radial, threaded openings to receive bolts 29 which extend through openings in the flanged end 30 of the joint part or member 20, and in a gasket between the two parts, the openings in the last mentioned members being of considerably greater diameter than the bolt shanks, so as to facilitate alignment of the members 20 and 21.

The joint member or portion 20 is the outer or casing member of the revolving joint and at its right end (as viewed in the drawings) is formed with an enlarged bore providing a chamber for a ball bearing assembly 31. The outer side of this end is threaded to receive a cap 32. The pipe or conduit section 19 provides the inner and revolving joint member or element and is formed with a flange 33 providing a stop means for one end of the ball bearing assembly, the other end of which is held in position by a washer 34 threaded on the member 19. A sealing washer 35 is provided in the cap adjacent its end and a gasket 36 of soft material (metal, fiber, rubber or the like) is placed around the pipe 19 and between the bearing 31 and lock washer 34.

The other end of the joint portion 20 is provided with a plurality of chevron gaskets 37 which surround the pipe section 19 and are pressed against an internal flange 38 on the member 20 by a spring 39, the other end of which bears against the end of the member 21.

In assembling the members 20 and 21, if it were not for my adjustable feature, it would be necessary to so thread the pipes 24 and 25 into the member 21 that the right end of the chamber 26 is exactly aligned with the pipe 19 and the pipe 19 maintained in an exactly horizontal plane. This is very difficult to do, because of the plurality of couplings to be made. Even when the parts are of substantially perfect construction, the parts might be out of alignment because one or another of the pipes was not threaded exactly right. It has been found, however, that by making the openings in the member 20 of considerably greater diameter than the bolts 29 the two parts 20 and 21 may be quickly and easily assembled and the fact that the centers of the members 20 and 21 are slightly out of alignment is unimportant, just so they are parallel.

In operation of a joint of this character with a steam drum, for example, the member 12 and the pipe 19 rotate and steam enters the receptacle through the pipe 24 and the parts with which it communicates. As the steam condenses into water, it falls to the bottom of the receptacle and is withdrawn therefrom through the pipe 27. The device disclosed may, however, be used with other devices, or its sections may be used separately in devices where both are not needed.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a revolving joint having members one of which is adapted to revolve about a certain axis and the other of which is adapted to be connected to a stationary element, apparatus comprising: a joint portion adapted to be attached to said stationary element and provided with a flat surface; another joint portion adapted to rotatably receive said revolving member and provided with a flat surface in part complementary to the flat surface on the first portion; bolt means having threaded shanks for fastening the portions together; and openings in said flat surfaces for receiving said bolt means, the opening in one surface being adapted threadingly to receive the bolt and the opening in the other surface being of greater diameter than the diameter of the bolt shank.

2. A revolving joint adapted to connect an element revolving on a certain axis to a fluid conduit element having a terminal part adjacent said axis, comprising: a first joint portion adapted to be connected to said revolving element; a second joint portion adapted to be connected to the terminal part of said conduit element; casing members for each of said joint portions with the casing member of said second joint portion having a hollowed out section facing the casing member on the first joint portion and approximately concentric with said terminal part, said hollowed out section having an outer diameter greater than its inner diameter to provide a funnel-shaped surface; a ball member in said hollowed out section and attached to said terminal part, with a portion of the ball member being located between said casing members; and bolt receiving means in said casing members to draw the joint portions together with a ball member therebetween, one of said bolt receiving means having an opening adapted snugly to receive said bolt and the other having an opening larger than said bolt.

3. A revolving joint adapted to connect an element revolving on a certain axis to a fluid conduit element having a terminal part adjacent said axis, comprising: a first joint portion adapted to be connected to said revolving element; a second joint portion adapted to be connected to the terminal part of said conduit element; casing members for each of said joint portions with the casing member of said second joint portion having a hollowed out section facing the casing member on the first joint portion and approximately concentric with said terminal part, said hollowed out section having an outer diameter greater than its inner diameter to provide a funnel-shaped surface; a ball member in said hollowed out section and attached to said terminal part, with a portion of the ball member being located between said casing members; a gasket between the ball member and said first joint portion; and bolt receiving means in said casing members to draw the joint portions together with the ball member therebetween, one of said bolt receiving means having an opening adapted snugly to receive said bolt and the other having an opening larger than said bolt.

4. A revolving joint structure adapted to connect an element revolving on a certain axis to a stationary element through a fluid conduit element having a terminal part adjacent said axis, comprising: a first joint portion adapted to be connected to said revolving element; a second joint portion adapted to be connected to the terminal part of said conduit element; casing members for each of said joint portions with the casing member of said second joint portion having a hollowed out section facing the casing member on the first joint portion and approximately concentric with said terminal part, said hollowed out section having an outer diameter greater than its inner diameter to provide a funnel-shaped surface; a ball member in said hollowed out section and attached to said terminal part, with a portion of the ball member being located between said casing members; a gasket between the ball member and said first joint portion; bolt receiving means in said casing members to draw the joint portions together with the ball member therebetween, one of said bolt receiving means having an opening adapted threadingly to receive said bolt and the other having an opening larger than said bolt; a third joint portion adapted to be attached to said stationary element and provided with an outwardly-extending flange; a fourth joint portion adapted rotatably to receive the end of said fluid conduit element that is opposite said terminal part thereof, said fourth joint portion being provided with an outwardly-extending flange located adjacent said first flange on the third joint portion; and bolts having threaded shanks for fastening said flanges together, said flanges having openings for receiving said bolts with the openings in one flange being adapted threadingly to receive the bolts and the openings in the other flange each being of greater diameter than the diameters of the corresponding bolt.

FRANCIS N. BARD.

REFERENCES CITED

The following references are of record in the file of this patent:

UNITED STATES PATENTS

| Number | Name | Date |
|---|---|---|
| 1,733,457 | Hannahs | Oct. 29, 1929 |
| 1,872,665 | Brownell | Aug. 23, 1932 |
| 2,385,421 | Monroe | Sept. 25, 1945 |